(12) United States Patent
Nagashima

(10) Patent No.: US 6,281,902 B1
(45) Date of Patent: Aug. 28, 2001

(54) THREE-DIMENSIONAL IMAGE CREATING APPARATUS

(75) Inventor: Hiroshi Nagashima, Wakayama (JP)

(73) Assignee: Shima Seiki Manufacturing Limited, Wakayama (JP)

(*) Notice: Subject to any disclaimer, the term of this patent is extended or adjusted under 35 U.S.C. 154(b) by 0 days.

(21) Appl. No.: 09/290,237

(22) Filed: Apr. 13, 1999

(30) Foreign Application Priority Data

Apr. 14, 1998 (JP) .................................................. 10-103066

(51) Int. Cl.[7] ........................................................ G06F 15/00
(52) U.S. Cl. ................................................................ 345/419
(58) Field of Search .................................... 345/419, 420, 345/421, 422, 433, 435

(56) References Cited

U.S. PATENT DOCUMENTS

| | | | | |
|---|---|---|---|---|
| 5,381,522 | * | 1/1995 | Seto et al. ............................. | 345/443 |
| 5,404,431 | * | 4/1995 | Kumazaki et al. ................... | 345/443 |
| 5,680,525 | | 10/1997 | Sakai et al. ........................... | 395/130 |

FOREIGN PATENT DOCUMENTS

| | | |
|---|---|---|
| 0 795 837 | 9/1997 | (EP) . |
| 5-143711 | 6/1993 | (JP) . |
| 10-3352 | 1/1998 | (JP) . |
| 10-97643 | 4/1998 | (JP) . |

\* cited by examiner

Primary Examiner—Phu K. Nguyen
(74) Attorney, Agent, or Firm—Wenderoth, Lind & Ponack, L.L.P.

(57) ABSTRACT

A three-dimensional image having a complicated shape is created from a two-dimensional image obtainable by simple drawing. When a drawing operation is carried out using a digitizer, density data to be stored in one of a density layer 0-data memory to a density layer n-data memory is created using a brush shape generated in a brush generating section. A distance up to a reference coordinate point with respect to a primitive shape is initially set in a distance data memory. A distance operating section computes a modification rate for modifying each point on the primitive shape, on the basis of two-dimensional density data selected by a selecting section. The selecting section sequentially reads out multi-layered density data, to cause a normal computing section to compute a normal direction on each point on the primitive shape or on the modified primitive shape from data in the vicinity of the point. A rendering section carries out modification with respect to each point on the primitive shape or on the modified primitive shape in the normal direction thereof, and then, a display device displays the modified shape as an image.

14 Claims, 5 Drawing Sheets

THREE-DIMENSIONAL IMAGE CREATING APPARATUS

BACKGROUND OF THE INVENTION

1. Field of the Invention

The present invention relates to a three-dimensional image creating apparatus for creating a three-dimensional image based on a two-dimensional image by using computer graphics.

2. Description of the Related Art

Conventionally, a method for creating various three-dimensional images with the use of computer graphics has been developed. Such a method is one of the most basic methods that comprises the steps of defining a three-dimensional shape by space coordinates, and displaying a state viewed from an arbitrary direction as a three-dimensional image projected on a two-dimensional plane by rendering.

Moreover, by using a two-dimensional image drawing tool called as "paint", it is possible to draw a picture on a display screen of computer graphics with a feeling such that a user actually draws a picture with a paintbrush or the like. Also, by applying a pictorial method capable of giving three-dimensional and perspective effects to a picture to be drawn, it is possible to draw a three-dimensional image.

In order to obtain a three-dimensional image, there is a method of inputting space coordinates which express a three-dimensional shape. However, according to the method, in the case where the three-dimensional shape is complicated, the number of required space coordinates increases, and consequently it is difficult to give definitions and input these space coordinates. Further, in a shape as smoothly modifying, it is difficult even to determine space coordinates. Furthermore, a designer is hard to grasp a relation between a spatial shape sensitively imaged and a geometric shape expressed by numerical coordinates. In particular, in the case of making a modification to the spatial shape, it is necessary to make modifications to coordinates which define the shape, which modifications are very troublesome.

According to a method of directly drawing a three-dimensional image with the use of the drawing tool of computer graphics, an operator who draws a picture, requires a picture drawing ability. The three-dimensional image thus created is usable in only limited range such as modification of display colors.

SUMMARY OF THE INVENTION

Accordingly, an object of the invention is to provide a three-dimensional image creating apparatus which can readily create a complicated three-dimensional shape model, and readily transform the created three-dimensional shape model for use.

The invention provides a three-dimensional image creating apparatus which makes a modification to a primitive shape so as to create a rendering image of a three-dimensional model, comprising density data memory means for storing two-dimensional density data to be mapped into a primitive shape; and modifying and operating means for reading out density data stored in the density data memory means to carry out predetermined operational processing for the primitive shape, making a modification to the primitive shape on the basis of an operational processing result, and thereby creating a three-dimensional model.

According to the invention, the density data memory means stores two-dimensional density data which is mapped into a primitive shape so as to make a modification to the primitive shape to create a rendering image of a three-dimensional model. The modifying and operating means carries out predetermined operational processing for the primitive shape on the basis of the density data, and then, makes a modification to the primitive shape according to the operational processing result so as to create a three-dimensional model. Since a three-dimensional model can be created on the basis of the primitive shape if two-dimensional density data is generated through drawing processing, by combining the primitive shape and the two-dimensional density data it is possible to handle a complicated shape while using simple images in the stage of density data. The two-dimensional density data is modified, and consequently a three-dimensional image to be created on the basis of the two-dimensional density data is modified. Therefore, from the same primitive shape, it is possible to readily obtain different three-dimensional images with the use of different two-dimensional density data.

Further, in the invention it is preferable that the density data memory means is capable of storing multilayered density data which is mapped into the same primitive shape, and that the modifying and operating means carries out the operational processing for the primitive shape on the multilayered data in order of the layers.

According to the invention, the multilayered two-dimensional density data is operationally processed in relation to the primitive shape in order of the multiple layers, whereby the three-dimensional model is created. Therefore, relatively simple density data is combined, and thereby, it is possible to readily obtain a three-dimensional image having a complicated shape.

Further, in the invention it is preferable that the modifying and operating means carries out operational processing in relation to the primitive shape starting from density data of a lowermost layer of the multilayered density data, and makes a modification in a normal direction on three-dimensional coordinates of the primitive shape or a modified shape resulted from modification of a lower layer, on the basis of an operational processing result of each layer.

According to the invention, the multilayered two-dimensional density data is reflected in a normal direction of the primitive shape so as to create a three-dimensional image. Therefore, gentle and rapid changes in density can be reflected on a three-dimensional shape as gentle and rapid changes in the three-dimensional shape.

Further, in the invention it is preferable that the modifying and operating means carries out the operational processing in such a manner that a distance between coordinates of each point constituting the primitive shape and predetermined reference coordinates is multiplied by a density for a corresponding point on the density data of a lower layer.

According to the invention, in making a modification to the primitive shape, the distance between coordinates of each point constituting the primitive shape and the predetermined reference coordinates is multiplied by a density for the corresponding point on the density data of a lower layer. And this multiplication leads the amount of modification in the normal direction. Accordingly, it is possible to vary a three-dimensional image to be created according to the setting of the reference coordinates.

In the invention it is preferable that the three-dimensional image creating apparatus further comprises layer display means for rendering, layer by layer, results of modifications which are made to the primitive shape by the modifying and operating means on the basis of the multilayered density data, and displaying the rendering results as an image.

According to the invention, it is possible to display the process in which the primitive shape is modified based on the multilayered two-dimensional density data by displaying the rendering results for the respective layers. Therefore, it is possible to keep track of a relation between density data and modification for each layer.

In the invention it is preferable that the three-dimensional image creating apparatus further comprises drawing and editing means for allowing input or edit in accordance with a drawing operation while displaying the density data stored in the density data memory means.

According to the invention, it is possible to input or transform according to a drawing operation the two-dimensional density data which is used in obtaining a three-dimensional image through making a modification to the primitive shape. Therefore, it is possible to create a three-dimensional model with a feeling as if in two-dimensional paint drawing. Thus, by drawing according to the multilayered density data, it is possible to readily create a three-dimensional image having a complicated shape.

As described above, according to the invention, it is possible to readily create a three-dimensional image on the basis of two-dimensional density data. Further, since density is related to a modified state of three-dimensional shape through the predetermined operational processing, it is possible to make a modification to a three-dimensional shape in accordance with two-dimensional contrast and to readily create a complicated shape and a shape which smoothly changes.

According to the invention, since the three-dimensional shape can be modified on the basis of the multilayered two-dimensional density data, it is possible to readily create a three-dimensional image having a complicated shape by combining two-dimensional density data of a relatively simple shape.

According to the invention, the primitive shape is sequentially modified by the use of the multilayered density data while the normal direction of a front is changed in accordance with the result of the operational processing. Therefore it is possible to carry out modeling of a complicated shape by the use of an inter-layer operation According to the invention, since modification according to the density data is carried out on the basis of the primitive shape serving as a base of the three-dimensional shape and the reference coordinates which serve as a reference, it is also possible to change a three-dimensional image to be created by varying the primitive shape or a setting of the reference coordinates.

According to the invention, since the process of modification based on the multilayered density data is displayed as a three-dimensional image for each layer through rendering, it is possible to keep track of a relation between density data and modification of each layer and to readily grasp the process in which a complicated shape is formed.

According to the invention, the density data stored in the density data memory means can be inputted or edited in accordance with a drawing operation, so that a three-dimensional image having a complicated shape can be readily created by a drawing operation with a feeling of painting. In the case of using the multilayered two-dimensional density data, it is possible to modify a three-dimensional image having a complicated shape by carrying out a relatively simple modification of each layer.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
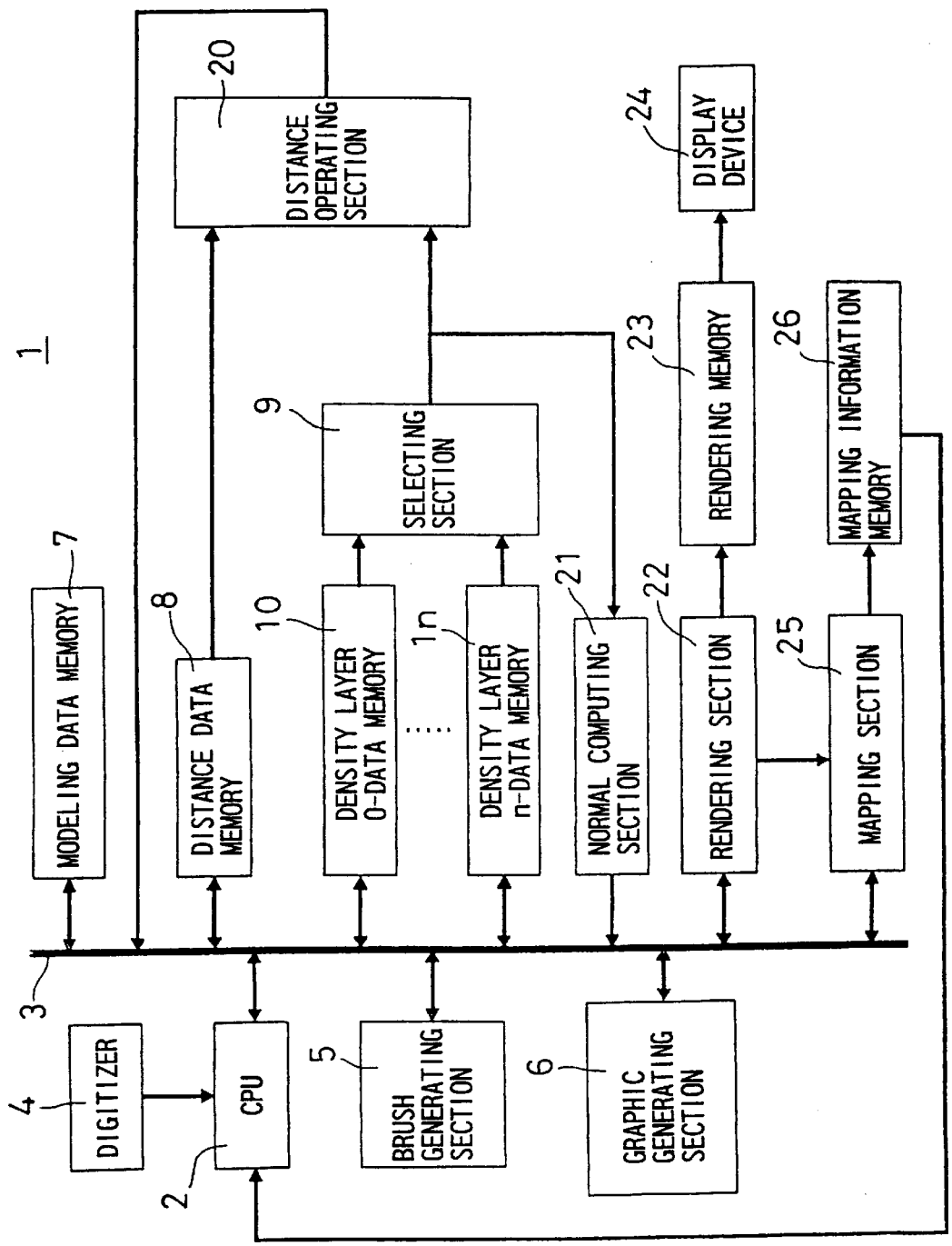
FIG. 1 is a block diagram schematically showing an electrical configuration of a three-dimensional image creating apparatus according to one embodiment of the invention.

Now referring to the drawings, preferred embodiments of the invention are described below.

FIG. 1 shows a schematic electrical configuration of a three-dimensional image creating apparatus 1 according to one embodiment of the invention. A CPU 2 is connected with components via a bus 3. A digitizer 4 carries out drawing processing, and informs the CPU 2 that drawing processing is carried out by means of an interruption signal when an operator carries out a drawing operation. Two-dimensional coordinates or the like generated by a drawing operation are read in the CPU 2 via the bus 3.

The components connected to the CPU 2 via the bus 3 include a brush generating section 5, a graphic generating section 6, a modeling data memory 7, a distance data memory 8 and the like. A selecting section 9 selects one density layer data memory from a density layer 0-data memory 10 to a density layer n-data memory 1n, which are connected to the CPU 2 via the bus 3. A distance operating section 20 carries out an operation of distance on the basis of outputs from the distance data memory 8 and the selecting section 9. Data on each point and a periphery thereof is read out from the density layer data memory selected by the selecting section 9. Then, a normal direction of density data on each point is computed by means of a normal computing section 21, and is outputted to the CPU 2 via the bus 3.

The bus 3 is further connected with a rendering section 22. The rendering section 22 has a rendering memory 23, and creates a three-dimensional image based on a three-dimensional shape by rendering. Further, the rendering section 22 stores the three-dimensional image thus created in the rendering memory 23. A display device 24 comprises a cathode-ray tube (CRT) or liquid crystal display (LCD), and reads and displays contents stored in the rendering memory 23. A mapping section 25 connected to the bus 3 carries out a mapping process between two-dimensional density data stored in the density layer 0-data memory 10 to the density layer n-data memory 1n and the primitive three-dimensional shape. The result of the mapping process at the mapping section 25 is stored in a mapping information memory 26.

The CPU 2 operates according to a preset program, and carries out various controls as the three-dimensional image creating apparatus 1. The digitizer 4 may have a combination of a pen and a tablet, so that designation on the two-dimensional coordinates can be made on the tablet with the pen. Preferably the pen is provided with a pen pressure mechanism for leading an output corresponding to a force with which the tablet is pressed. The brush generating section 5 adds data for permitting various shapes of brushes to the pen of the digitizer 4. The brushes are provided with thicknesses corresponding to the respective shapes, and a density distribution profile. In the case where the pen is provided with the pen pressure mechanism, the thickness of the pen can be changed in accordance with a pen pressure. In the brush generating section 5, drawing processing is carried out around the coordinates designated by means of the digitizer 4, with respect to a density layer stored in the density layer 0-data memory 10 to the density layer n-data memory 1n. In the graphic generating section 6, the two-dimensional density data stored in the density layer 0 data memory 10 to the density layer n data memory 1n is subjected to graphic processing so as to generate an image. For example, gradation where density of image continuously changes may be obtained through the drawing operation on the digitizer 4, however, it may be obtained automatically in the graphic generating section 6.

The modeling data memory 7 stores space coordinates expressing a primitive shape for creating a three-dimensional model. A distance up to corresponding reference coordinates in the primitive shape is firstly set in the distance data memory 8, and when the primitive shape is modified for each layer, the operational result of the distance operating section 20 is inputted to the distance data memory 8. The selecting section 9 selects one density layer from the density layer 0-data memory 10 to the density layer n-data memory in which store a plurality of layers, and then, supplies the selected one to the distance operating section 20. Then, the distance operating section 20 multiplies distance data read from the distance data memory 8 by density data, and again stores the multiplied result in the distance data memory.

The data which is operationally processed in the selecting section 9 and the distance operating section 20 is changed over for each point of two-dimensional density data. In the normal computing section 21, a normal vector for each point is computed with reference to data on the vicinity of each point. The rendering section 22 subjects three-dimensional models obtained in the process of making a modification to the primitive shape for each layer, to rendering, and then, stores the results in the rendering memory 23. Data stored in the rendering memory 23 is read out by means of the display device 24, and then, is displayed as a three-dimensional image. When the rendering section 22 carries out rendering, the mapping section 25 computes a mapping coordinate value indicative of the relation between coordinates of a point on the primitive shape corresponding to the two-dimensional density data and a pixel on the three-dimensional image displayed by rendering, and then, writes the mapping coordinate value in the mapping information memory 26.

When the display device 24 displays the three-dimensional image, it is possible to carry out a drawing operation such as modification to the displayed image with the use of the digitizer 4. In such a case, mapping coordinates are read out from the mapping information memory 26 to be inputted to the CPU 2 in correspondence with screen coordinates on the displayed image of the display device 24 designated by the digitizer 4. The CPU 2 can carry out a modification with respect to the two-dimensional density of one of the density layer 0-data memory 10 to the density layer n-data memory in, on the basis of the mapping coordinates.

Figure 2:
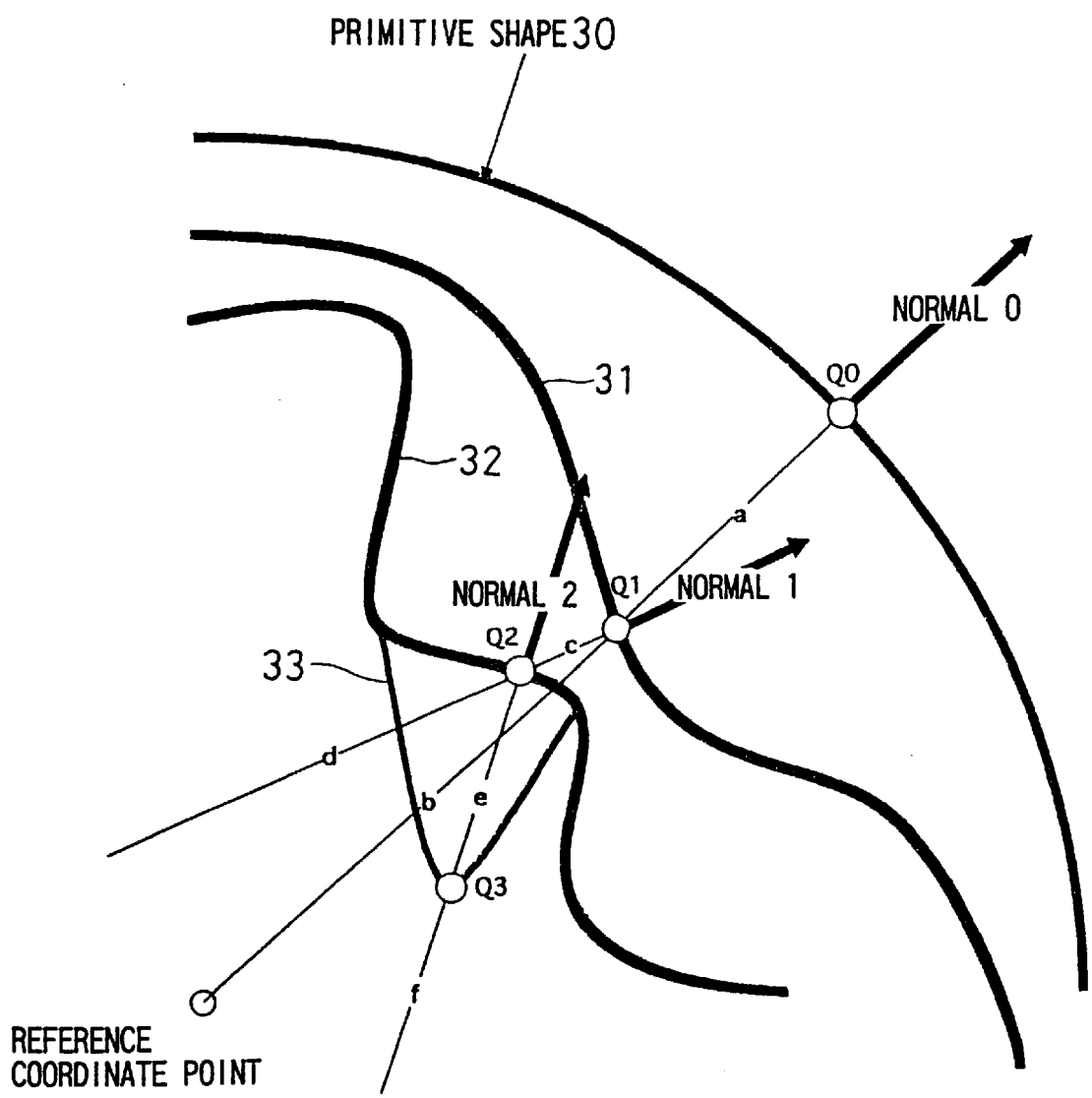
FIG. 2 is a view showing a process in which a primitive shape 30 is modified on the basis of multilayered two-dimensional density data in the embodiment of FIG. 1.

FIG. 2 shows a basic concept for modifying a shape on the basis of a reference coordinate point 29 and a primitive shape 30. The primitive shape 30 is a cylindrical surface centered on the reference coordinate point 29. In FIG. 2, a line segment connecting the reference coordinate point 29 and a point Q0 on the primitive shape 30 coincides with a normal at the point Q0 on the primitive shape 30. Assuming that a density of the point Q0 on the primitive shape 30 according to two-dimensional data of a first layer is a/b, the primitive shape 30 is modified by the first layer, and thereby, a first modified shape 31 is obtained. A point Q1 on a modified shape 31 corresponding to the point Q0 on the primitive shape 30 is a point which divides a line segment connecting the point Q0 and the reference coordinate point 29 into a ratio of a to b. Likewise, for points around the point Q1 on the modified shape 31, modification with respect to the primitive shape 30 is carried out on the basis of two-dimensional density data of the first layer. As a result, a normal direction at the point Q1 on the modified shape 31 does not always coincide with the normal direction at the point Q0 on the primitive shape 30. Next, the modified shape 31 is subjected to a modifying process using a two-dimensional density data. According to the second modifying process, a second modified shape 32 is obtained in such a way that a point Q2 is on the point that divides a line segment between the point Q1 on the modified shape 31 and the reference coordinate point 29 into a ratio of c to d on the basis of the second density data, that is, c/d. Subsequently, when carrying out a modification on the basis of two-dimensional density data of a third layer, for example, the point Q2 on the second modified shape 32 is changed into a point Q3 on a third modified shape 33.

In the manner as described above, the first layer is reflected on the primitive shape 30 so as to transform the primitive shape 30, and sequentially, the second layer is reflected on the modified shape 31, and further, the third layer is reflected on the modified shape 32. This becomes possible because the two-dimensional density data has a layer structure. Conceptually, data is sequentially layered on the primitive shape 30 from the first layer, and then, the modification results are produced in such a manner that the primitive shape 30, the modified shape 31 and the modified shape 32 are layered in this order. Therefore, the two-dimensional density data of the first layer which is the lowermost layer is reflected on the primitive shape 30 so as to transform the primitive shape 30, and then, the two-dimensional density data of lower layers is sequentially reflected on a shape after being modified.

Figure 3:
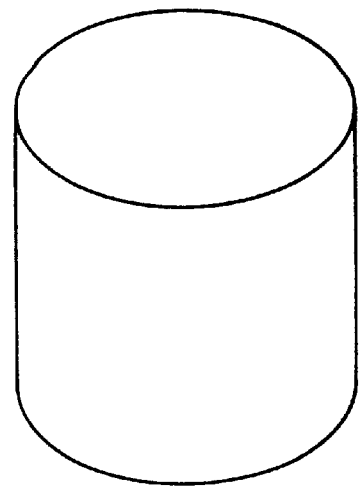
FIG. 3 is a perspective view showing one example of the primitive shape 30 of FIG. 2.
Figure 4:
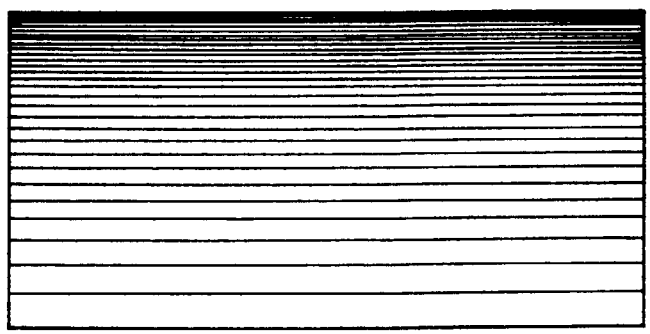
FIG. 4 is a view showing an example of density data of a first layer used for making a modification to the primitive shape as shown in FIG. 3.
Figure 5:
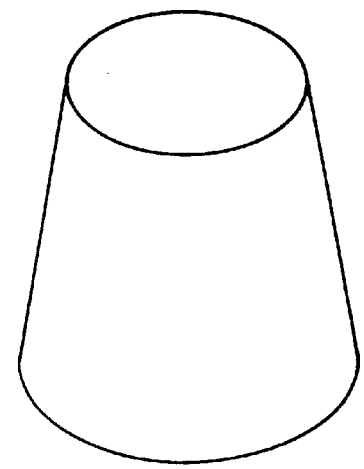
FIG. 5 is a perspective view showing a modified shape of the primitive shape of FIG. 3 obtained by reflecting the density data shown in FIG. 4.
Figure 6:
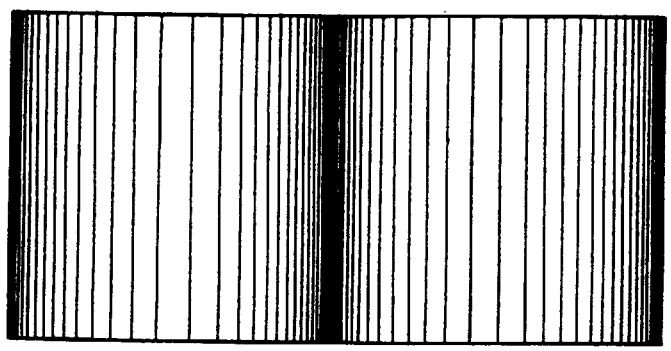
FIG. 6 is a view showing an example of density data which will be reflected on the three-dimensional shape of FIG. 5.
Figure 7:
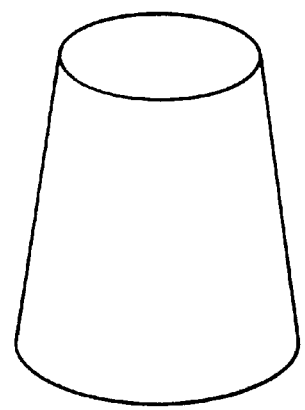
FIG. 7 is a perspective view showing a modified shape of the shape shown in FIG. 5, obtained by reflecting the density data shown in FIG. 6.
Figure 8:
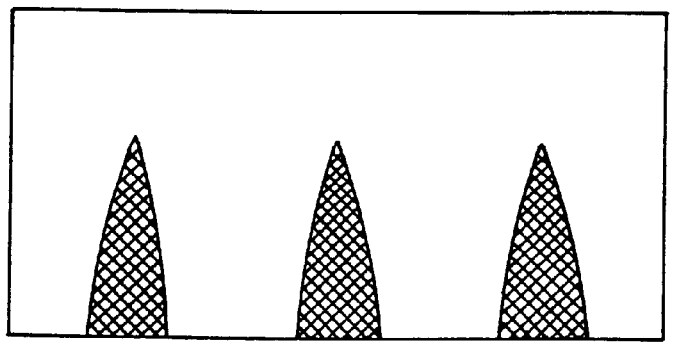
FIG. 8 is a view showing density data which will be reflected on the shape shown in FIG. 7.
Figure 9:
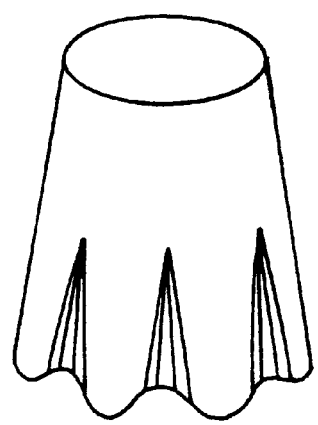
FIG. 9 is a perspective view showing a modified shape of the shape shown in FIG. 7, obtained by reflecting the density data shown in FIG. 8.

FIGS. 3 to 9 show examples of drawing processing of a skirt shape with drapes. When two-dimensional density data of the first layer having density gradation as shown in FIG. 4 is reflected on a cylinder-like primitive shape as shown in FIG. 3, a shape of circular truncated cone as shown in FIG. 5 can be obtained. Further, when two-dimensional density data as shown in FIG. 6 which represents periodical density changes in the right and left directions, is reflected on the shape of FIG. 5 as the second layer data, a shape as shown in FIG. 7 is compressed and flattened in the back and forward direction. Furthermore, when two-dimensional density data shown in FIG. 8 is reflected on the shape of FIG. 7 as the third layer data, drapes as shown in FIG. 9 can be presented to the shape.

Figure 10:
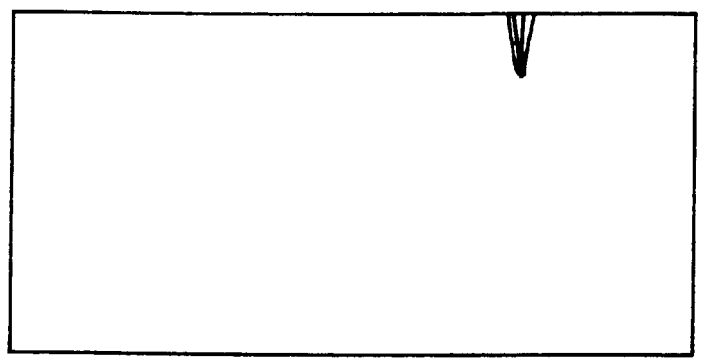
FIG. 10 is a view showing density data which will be reflected on to the shape shown in FIG. 7.
Figure 11:
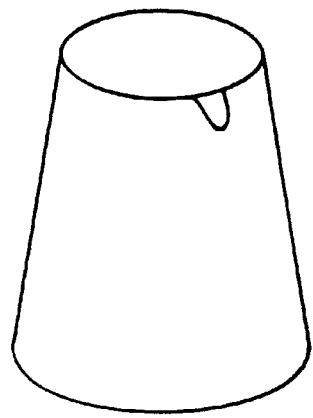
FIG. 11 is a perspective view showing a modified shape of the shape shown in FIG. 7, obtained by reflecting the density data shown in FIG. 10.

In a state of being flattened as shown in FIG. 7, when reflecting a two-dimensional density data as shown in FIG. 10, it is possible to form a concave portion on an upper portion of the shape, as shown in FIG. 11.

By applying the above embodiment, in addition to a three-dimensional display of clothes such as the skirts shown in FIGS. 3 to 11, it is possible to readily display a curtain or the like in three-dimension by using a primitive shape in a flat-plate form. Further, a surface of the three-dimensional display thus obtained is subjected to texture mapping or bump mapping, and thereby, it is possible to further impart three-dimensional effect and a feel of material.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A three-dimensional image creating apparatus which makes a modification to a primitive shape so as to create a rendering image of a three-dimensional model, comprising:
    density data memory means for storing two-dimensional density data to be mapped into a primitive shape; and
    modifying and operating means for reading out density data stored in the density data memory means to carry out predetermined operational processing for the primitive shape, making a modification to the primitive shape on the basis of an operational processing result, and thereby creating a three-dimensional model.

2. The three-dimensional image creating apparatus of claim 1, wherein the density data memory means is capable of storing multilayered density data which is mapped into the same primitive shape, and the modifying and operating means carries out the operational processing for the primitive shape on the multilayered data in order of the layers.

3. The three-dimensional image creating apparatus of claim 2, wherein the modifying and operating means carries out operational processing in relation to the primitive shape starting from density data of a lowermost layer of the multilayered density data, and makes a modification in a normal direction on three-dimensional coordinates of the primitive shape or a modified shape resulted from modification of a lower layer, on the basis of an operational processing result of each layer.

4. The three-dimensional image creating apparatus of claim 3, wherein the modifying and operating means carries out the operational processing in such a manner that a distance between coordinates of each point constituting the primitive shape and predetermined reference coordinates is multiplied by a density for a corresponding point on the density data of a lower layer.

5. The three-dimensional image creating apparatus of claim 2, further comprising:
    layer display means for rendering, layer by layer, results of modifications which are made to the primitive shape by the modifying and operating means on the basis of the multilayered density data, and displaying the rendering results as an image.

6. The three-dimensional image creating apparatus of claim 3, further comprising:
    layer display means for rendering, layer by layer, results of modifications which are made to the primitive shape by the modifying and operating means on the basis of the multilayered density data, and displaying the rendering results as an image.

7. The three-dimensional image creating apparatus of claim 4, further comprising:
    layer display means for rendering, layer by layer, results of modifications which are made to the primitive shape by the modifying and operating means on the basis of the multilayered density data, and displaying the rendering results as an image.

8. The three-dimensional image creating apparatus of claim 1, further comprising:
    drawing and editing means for allowing input or edit in accordance with a drawing operation while displaying the density data stored in the density data memory means.

9. The three-dimensional image creating apparatus of claim 2, further comprising:
    drawing and editing means for allowing input or edit in accordance with a drawing operation while displaying the density data stored in the density data memory means.

10. The three-dimensional image creating apparatus of claim 3, further comprising:
    drawing and editing means for allowing input or edit in accordance with a drawing operation while displaying the density data stored in the density data memory means.

11. The three-dimensional image creating apparatus of claim 4, further comprising:
    drawing and editing means for allowing input or edit in accordance with a drawing operation while displaying the density data stored in the density data memory means.

12. The three-dimensional image creating apparatus of claim 5, further comprising:
    drawing and editing means for allowing input or edit in accordance with a drawing operation while displaying the density data stored in the density data memory means.

13. The three-dimensional image creating apparatus of claim 6, further comprising:
    drawing and editing means for allowing input or edit in accordance with a drawing operation while displaying the density data stored in the density data memory means.

14. The three-dimensional image creating apparatus of claim 7, further comprising:
    drawing and editing means for allowing input or edit in accordance with a drawing operation while displaying the density data stored in the density data memory means.

* * * * *